(12) United States Patent
Yokota

(10) Patent No.: US 11,773,766 B2
(45) Date of Patent: Oct. 3, 2023

(54) INTAKE DEVICE OF INTERNAL COMBUSTION ENGINE

(71) Applicant: HONDA MOTOR CO., LTD., Tokyo (JP)

(72) Inventor: Ryo Yokota, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/971,826

(22) Filed: Oct. 24, 2022

(65) Prior Publication Data
US 2023/0129282 A1 Apr. 27, 2023

(30) Foreign Application Priority Data

Oct. 26, 2021 (JP) .................................. 2021-174442

(51) Int. Cl.
*F02B 29/04* (2006.01)
*F02B 19/18* (2006.01)

(52) U.S. Cl.
CPC ........ *F02B 29/0468* (2013.01); *F02B 29/045* (2013.01); *F02B 29/0418* (2013.01); *F02B 19/18* (2013.01); *F02B 29/04* (2013.01)

(58) Field of Classification Search
CPC .............. F02B 29/0468; F02B 29/0418; F02B 29/045; F02B 19/18; F02B 29/04; F02B 29/0406; F02B 29/0475; F02B 37/18; F02B 33/44; F02B 37/16; F02B 29/0437; F02B 29/0456; F02B 29/0462; Y02T 10/12; F02D 41/0007; F02M 35/1261; F02M 35/10157; F02M 35/1266; F02M 35/10137;

(Continued)

(56) References Cited

U.S. PATENT DOCUMENTS 4,444,013 A * 4/1984 Inoue ...................... F02B 27/00
123/184.57
4,878,460 A * 11/1989 Uchida ............... F02B 27/0242
123/563

(Continued)

FOREIGN PATENT DOCUMENTS

FR         3007456 A1 * 12/2014 .......... F02B 29/0468
JP       2000310124 A  * 11/2000
(Continued)

*Primary Examiner* — Sizo B Vilakazi
*Assistant Examiner* — Brian R Kirby
(74) *Attorney, Agent, or Firm* — Armstrong Teasdale LLP

(57) ABSTRACT

An intake device for an internal combustion engine includes: a main pipe having an upstream end forming a suction port and a downstream end configured to be connected to an intake port of an internal combustion engine main body; a compressor of a supercharger provided in the main pipe; an intercooler provided in the main pipe at a position downstream of the compressor and including a cooling part, an upstream header provided upstream of the cooling part, and a downstream header provided downstream of the cooling part; a throttle valve disposed in the main pipe at a position downstream of the intercooler; a bypass pipe having a first end and a second end, the bypass pipe being connected to a part of the main pipe between the cooling part and the throttle valve; and a catch tank provided in the bypass pipe and configure to catch condensed water.

6 Claims, 6 Drawing Sheets

(58) Field of Classification Search
CPC ............. F02M 35/12; F02M 35/10144; F02M 35/10295; F02M 35/10; F02M 35/10354; F02M 35/10091; F02M 25/0228; F02M 25/025; F02M 35/14
USPC .................................... 123/542, 563; 60/599
See application file for complete search history.

(56) References Cited

U.S. PATENT DOCUMENTS

| | | | | |
|---|---|---|---|---|
| 5,033,268 A | * | 7/1991 | Hitomi | F02B 27/0252 123/184.53 |
| 5,121,733 A | * | 6/1992 | Goto | F02B 27/005 123/559.1 |
| 5,148,786 A | * | 9/1992 | Matsumura | F02M 35/14 96/388 |
| 5,478,098 A | * | 12/1995 | Akagi | B60K 13/02 180/69.22 |
| 5,957,102 A | * | 9/1999 | Schorn | F02M 35/10386 123/184.57 |
| 7,251,937 B2 | * | 8/2007 | Appleton | F02B 29/0468 60/599 |
| 7,950,363 B2 | * | 5/2011 | Currie | F02M 35/10295 181/204 |
| 8,191,366 B2 | * | 6/2012 | Taylor | F02B 29/0468 60/599 |
| 9,010,112 B2 | * | 4/2015 | Palm | F02B 29/0468 60/599 |
| 9,133,757 B2 | * | 9/2015 | Glugla | F02D 41/123 |
| 9,181,852 B2 | * | 11/2015 | Yamada | F02M 25/028 |
| 9,181,853 B2 | * | 11/2015 | Leone | F01M 13/028 |
| 9,267,424 B2 | * | 2/2016 | Wicks | F02M 25/0227 |
| 9,546,590 B2 | * | 1/2017 | Radmard | F02M 26/32 |
| 10,100,715 B2 | * | 10/2018 | Dieterle | F02B 29/0468 |
| 10,190,550 B2 | * | 1/2019 | Owen | F02M 35/10255 |
| 10,480,534 B2 | * | 11/2019 | Mahalatkar | F04D 25/024 |
| 11,408,361 B2 | * | 8/2022 | Gilmer | F02B 37/16 |
| 2010/0077995 A1 | * | 4/2010 | Buia | F02B 29/0468 123/542 |
| 2010/0300647 A1 | * | 12/2010 | Steurer | F28F 17/005 165/52 |
| 2011/0107760 A1 | * | 5/2011 | Quinn | F02M 25/028 60/599 |
| 2014/0326215 A1 | * | 11/2014 | Haefner | F02M 35/16 123/563 |
| 2017/0350353 A1 | * | 12/2017 | Nemesh | F02M 35/10157 |
| 2017/0362995 A1 | * | 12/2017 | Saindon | F02M 35/10157 |

FOREIGN PATENT DOCUMENTS

| | | | | |
|---|---|---|---|---|
| JP | 2005226476 A | * | 8/2005 | ......... F02B 29/0468 |
| JP | 2011133198 A | * | 7/2011 | |
| JP | 2014169654 A | | 9/2014 | |
| JP | 2015200184 A | * | 11/2015 | ............. B60K 13/02 |
| WO | WO-2009130083 A1 | * | 10/2009 | ......... F02B 29/0418 |
| WO | WO-2015152374 A1 | * | 10/2015 | ............. B60K 13/02 |

* cited by examiner

INTAKE DEVICE OF INTERNAL COMBUSTION ENGINE

TECHNICAL FIELD

The present invention relates to an intake device for an internal combustion engine.

BACKGROUND ART

Conventionally, as an intake device for an internal combustion engine, there is known an intake device including: an intake pipe communicating with a combustion chamber, a compressor of a supercharger (turbocharger) provided in the intake pipe; an intercooler provided in the intake pipe at a position downstream of the compressor; a throttle valve provided in the intake pipe at a position downstream of the intercooler; and an intake manifold provided in the intake pipe at a position downstream of the throttle valve (for example, JP2014-169654A). Fuel injected by a fuel injection device is combusted with air introduced in the combustion chamber via the intake pipe.

The intake device disclosed in JP2014-169654A further includes a condensed water discharge device including a storage tank. The storage tank has a function of storing condensed water that is generated as a result of cooling of air in the intercooler. Thereby, risk of corrosion of the intake pipe due to the condensed water is reduced. This condensed water discharge device includes a supply pipe having one end connected to the storage tank and another end connected to a part of the intake pipe downstream of the intercooler and upstream of the throttle valve, and a discharge pipe having one end connected to the storage tank and another end connected to the intake manifold. Since the pressure in the intake manifold is negative, the condensed water stored in the storage tank is discharged to the intake manifold via the discharge pipe.

In the intake device disclosed in JP2014-169654A, when the internal combustion engine is idling, for example, the throttle valve closes the intake passage, and this increases the magnitude of the negative pressure in the intake manifold. As a result, a large amount of condensed water is introduced into the intake manifold per predetermined time while idling, and this may cause misfire of fuel in the combustion chamber.

SUMMARY OF THE INVENTION

In view of the foregoing background, a primary object of the present invention is to provide an intake device for an internal combustion engine which can prevent misfire while idling.

To achieve the above object, one aspect of the present invention provides an intake device (4) for an internal combustion engine (1), comprising: a main pipe (14) having an upstream end forming a suction port (13) and a downstream end configured to be connected to an intake port (10) of an internal combustion engine main body (3); a compressor (18) of a supercharger (17) provided in the main pipe; an intercooler (19) provided in the main pipe at a position downstream of the compressor and including a cooling part (26), an upstream header (27) provided upstream of the cooling part, and a downstream header (28) provided downstream of the cooling part; a throttle valve (20) disposed in the main pipe at a position downstream of the intercooler; a bypass pipe (30) having a first end (30A) and a second end (30B), the bypass pipe being connected to a part of the main pipe between the cooling part and the throttle valve; and a catch tank (31) provided in the bypass pipe and configured to catch condensed water.

According to this configuration, since the first end and the second end of the bypass pipe including the catch tank are connected to a part of the main pipe downstream of the intercooler and upstream of the throttle valve, even when the internal combustion engine is idling, a large pressure difference is less likely to be produced between the first end of the bypass pipe and the catch tank. Accordingly, it is unlikely that a large amount of water is discharged from the catch tank per predetermined time, and therefore, the intake device can prevent misfire of the internal combustion engine while idling.

Preferably, the intake device further comprises a resonator (43) connected to the bypass pipe.

According to this configuration, the noise generated in the intake device can be suppressed.

Preferably, the resonator is connected to a part of the bypass pipe downstream of the catch tank.

According to this configuration, a part of the bypass pipe connected to the resonator can be used as a part of the resonator, whereby the degree of freedom of design of the resonator is improved.

Preferably, the bypass pipe comprises: a first part (32) including the first end and connected to an inlet of the catch tank; and a second part (33) including the second end and extending upward from an outlet of the catch tank, and the resonator comprises: a main body (44) defining a volume chamber and disposed higher than the catch tank; and a communication pipe part (45) extending downward from a bottom surface of the main body and connected to the second part.

According to this configuration, since the resonator is disposed above the catch tank and the communication pipe part extends downward from the bottom surface of the main body, condensed water in the resonator can be discharged to the bypass pipe.

Preferably, the cooling part of the intercooler includes multiple heat dissipation pipes (29) extending in a first axial direction, the main pipe comprises an intermediate portion (15) extending from the downstream header in a direction perpendicular to the first axial direction, and the first part of the bypass pipe is connected to the downstream header and extends in the first axial direction.

According to this configuration, the condensed water is easily guided to the inside of the bypass pipe due to inertial force.

Preferably, the cooling part, the downstream header, and the first part of the bypass pipe extend in a lateral direction of a vehicle in which the internal combustion engine is mounted, and the intermediate portion extends from the downstream header upward with respect to the vehicle.

According to this configuration, the condensed water generated by the intercooler is guided to the inside of the bypass pipe even more easily.

Preferably, the second part of the bypass pipe has a cross-sectional area smaller than a cross-sectional area of the intermediate portion of the main pipe.

According to this configuration, the sound absorbing effect of the resonator is improved.

Preferably, the catch tank comprises: a case (35) that is cylindrical in shape and has a central axis extending in an up-down direction; an inlet pipe (36) extending from an upper portion of an outer circumferential surface of the case in a tangential direction; an outlet pipe (37) extending from an upper end of the case along the central axis toward an interior of the case; and a partition wall (41) connected to an inner surface of the case and the outlet pipe, the inlet pipe is connected to the first part, an upper end of the outlet pipe is connected to the second part, and a lower end of the outlet pipe is disposed such that a predetermined gap is defined between the lower end of the outlet pipe and a bottom surface of the case.

According to this configuration, the condensed water (and air) guided to the inside of the catch tank hits the partition wall, whereby the condensed water and the air can be separated efficiently. Also, owing to the outlet pipe that opens downward, the condensed water can be discharged to the intermediate portion according to the magnitude the negative pressure.

Preferably, a lower edge of an open end of the inlet pipe on a side of the case is disposed higher than a lower end of the outlet pipe.

According to this configuration, the liquid level of the condensed water is maintained lower than the open end of the inlet pipe on the side of the case, and therefore, reverse flow of the condensed water can be prevented.

According to the aspect of the present invention, an intake device for an internal combustion engine which can prevent misfire while idling is provided.

DETAILED DESCRIPTION OF THE INVENTION

In the following, an embodiment in which an intake device according to the present invention is applied to an internal combustion engine of an automobile will be described in detail with reference to the drawings. The internal combustion engine may be a known engine such as a gasoline engine, a diesel engine, a homogeneous charge compression ignition (HCCI) engine, and so on.

Figure 1:
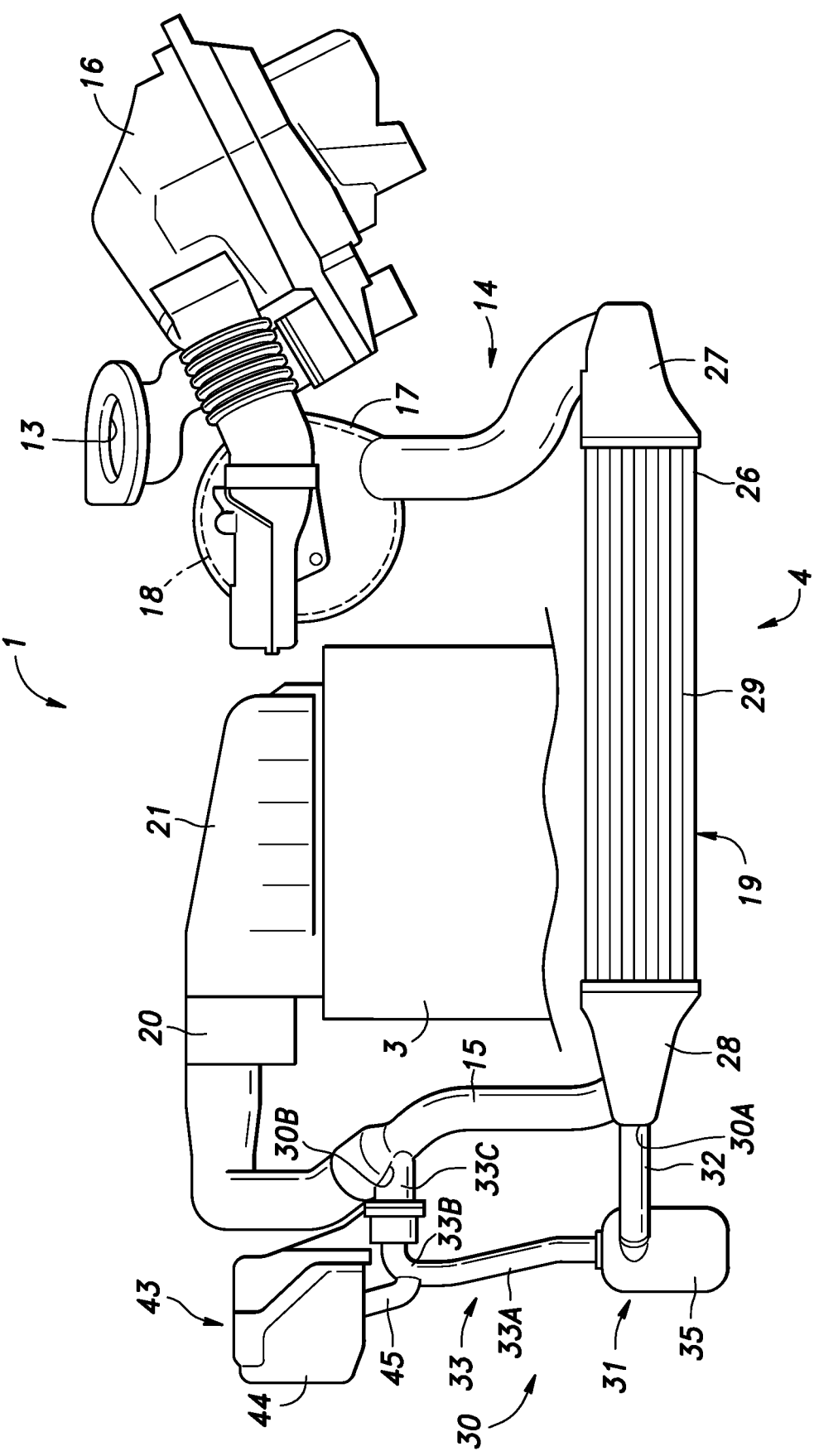
FIG. 1 is a front view of an internal combustion engine provided with an intake device according to an embodiment of the present invention.

In the present embodiment, as shown in FIG. 1, an internal combustion engine 1 includes an internal combustion engine main body 3 having a cylinder (not shown in the drawings) formed therein, an intake device 4 for supplying intake air to the internal combustion engine main body 3, and an exhaust device (not shown in the drawings) for discharging exhaust gas generated in the internal combustion engine main body 3. The cylinder of the internal combustion engine main body 3 receives a piston (not shown in the drawings) therein so that the piston can reciprocate. An upper end portion of the cylinder forms a combustion chamber (not shown in the drawings). The internal combustion engine main body 3 includes an intake port (not shown in the drawings) and an exhaust port (not shown in the drawings) each extending from the combustion chamber to an outer surface of the internal combustion engine main body 3.

The intake device 4 includes a main pipe 14 having an upstream end that forms a suction port 13 and a downstream end connected to the intake port of the internal combustion engine main body 3. The main pipe 14 defines an intake passage extending from the suction port 13 to the intake port. The intake passage is provided, in order from the upstream side, an air cleaner 16, a compressor 18 of a turbocharger 17 which is a supercharger, an intercooler 19, a throttle valve 20, and an intermediate manifold 21. Air is sucked in through the suction port 13, and after foreign matter is removed at the air cleaner 16, is pressurized at the compressor 18. Thereafter, the air is cooled in the intercooler 19, and after the flow rate is adjusted by the throttle valve 20, is supplied into the combustion chamber.

The exhaust device includes an exhaust passage which is in communication with the intake port. The exhaust passage is provided, in order from the upstream side, a turbine of the turbocharger 17, a catalyst converter, a silencer, and an exhaust outlet (all of them not shown in the drawings). The exhaust gas (combustion gas) generated due to combustion in the combustion chamber passes the turbine, thereafter is purified by the catalyst converter, and passes the silencer to be released to the atmosphere through the exhaust outlet.

The turbocharger 17 is constituted of the compressor 18 and the turbine. The compressor 18 includes a hollow compressor housing that serves as an outer shell and a compressor wheel (compressor impeller) rotatably received in the compressor housing. The compressor housing has a compressor inlet connected to a part of the main pipe 14 downstream of the air cleaner 16 and a compressor outlet connected to a part of the main pipe 14 upstream of the intercooler 19.

The intercooler 19 includes a cooling part 26, an upstream header 27 provided upstream of the cooling part 26, and a downstream header 28 provided downstream of the cooling part 26. The cooling part 26 includes multiple heat dissipation pipes 29 extending in a first axial direction. In the present embodiment, the first axial direction extends in a lateral direction of the vehicle in which the internal combustion engine 1 is mounted. Also, the upstream header 27, the cooling part 26, and the downstream header 28 likewise extend in the lateral direction of the vehicle. The intercooler 19 is disposed in a front lower portion of the vehicle.

The upstream header 27 is connected to a downstream end of a part of the main pipe 14 between the compressor 18 and the intercooler 19. The downstream header 28 is connected to an upstream end of a part of the main pipe 14 between the intercooler 19 and the throttle valve 20 (hereinafter, this part of the main pipe 14 will be referred to as an intermediate portion 15). The intermediate portion 15 extends in a direction perpendicular to the first axial direction. In the present embodiment, the intermediate portion 15 extends from the downstream header 28 upward with respect to the vehicle.

A bypass pipe 30 having a first end 30A and a second end 30B is connected to a part of the main pipe 14 between the cooling part 26 and the throttle valve 20. In the present embodiment, the bypass pipe 30 is connected to the downstream header 28 and the intermediate portion 15 of the main pipe 14.

The bypass pipe 30 includes a first part 32 including the first end 30A and connected to an inlet of a catch tank 31 and a second part 33 including the second end 30B and extending upward from an outlet of the catch tank 31. The catch tank 31 has a function of storing condensed water that is generated from the air cooled by the intercooler 19.

The first end 30A of the bypass pipe 30 (the first part 32) is connected to the downstream header 28 of the intercooler 19. In another embodiment, the first part 32 may be connected to the intermediate portion 15. The first part 32 extends in the first axial direction. Namely, in the present embodiment, the first part 32 extends in the lateral direction of the vehicle in which the internal combustion engine 1 is mounted.

Figure 2:
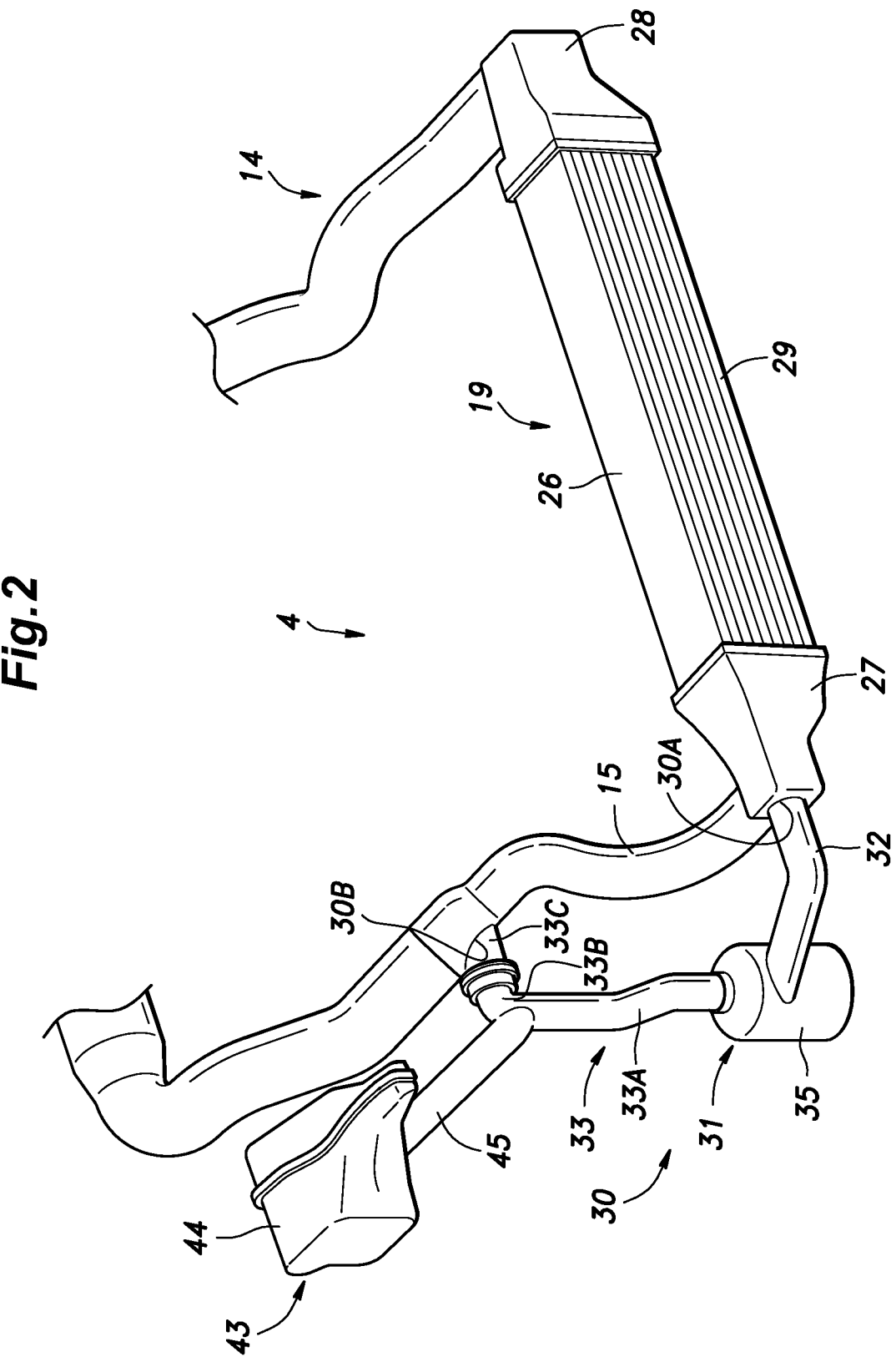
FIG. 2 is a perspective view of the intake device.

The second end 30B of the bypass pipe 30 (the second part 33) is connected to a substantially central part of the intermediate portion 15 of the main pipe 14 in the up-down direction. As shown in FIG. 2, the second part 33 includes an upstream part 33A extending upward from the outlet pipe upper portion 40 (see FIGS. 3 and 4) of the catch tank 31, a bent part 33B that is bent to extend from the tip of the upstream part 33A toward the intermediate portion 15, and a downstream part 33C extending substantially laterally from the tip of the bent part 33B. The upstream part 33A extends substantially in parallel with the intermediate portion 15 of the main pipe 14. The tip of the downstream part 33C is connected to the intermediate portion 15. The downstream part 33C extends substantially laterally. The second part 33 has a cross-sectional area smaller than the cross-sectional area of the intermediate portion 15 of the main pipe 14. In the present embodiment, the upstream part 33A and the bent part 33B have a cross-sectional area smaller than the cross-sectional area of the intermediate portion 15.

Figure 3:
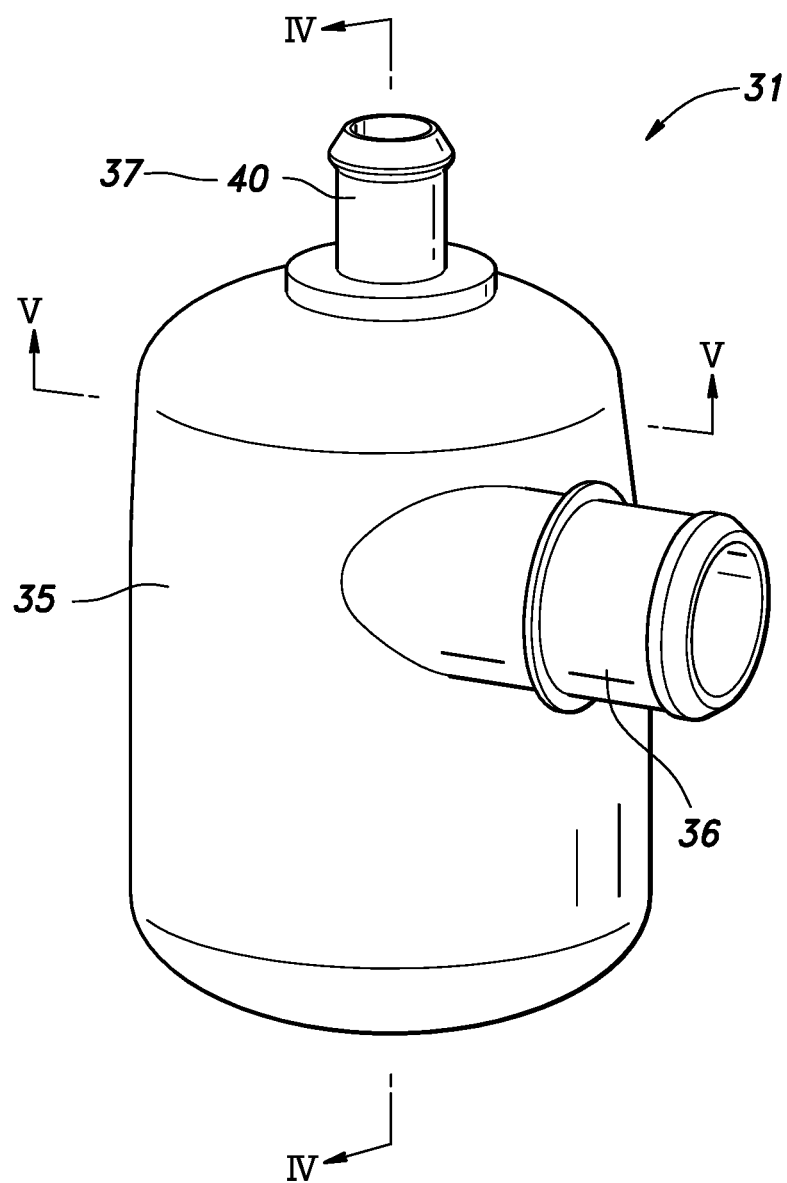
FIG. 3 is a perspective view of a catch tank of the intake device.
Figure 4:
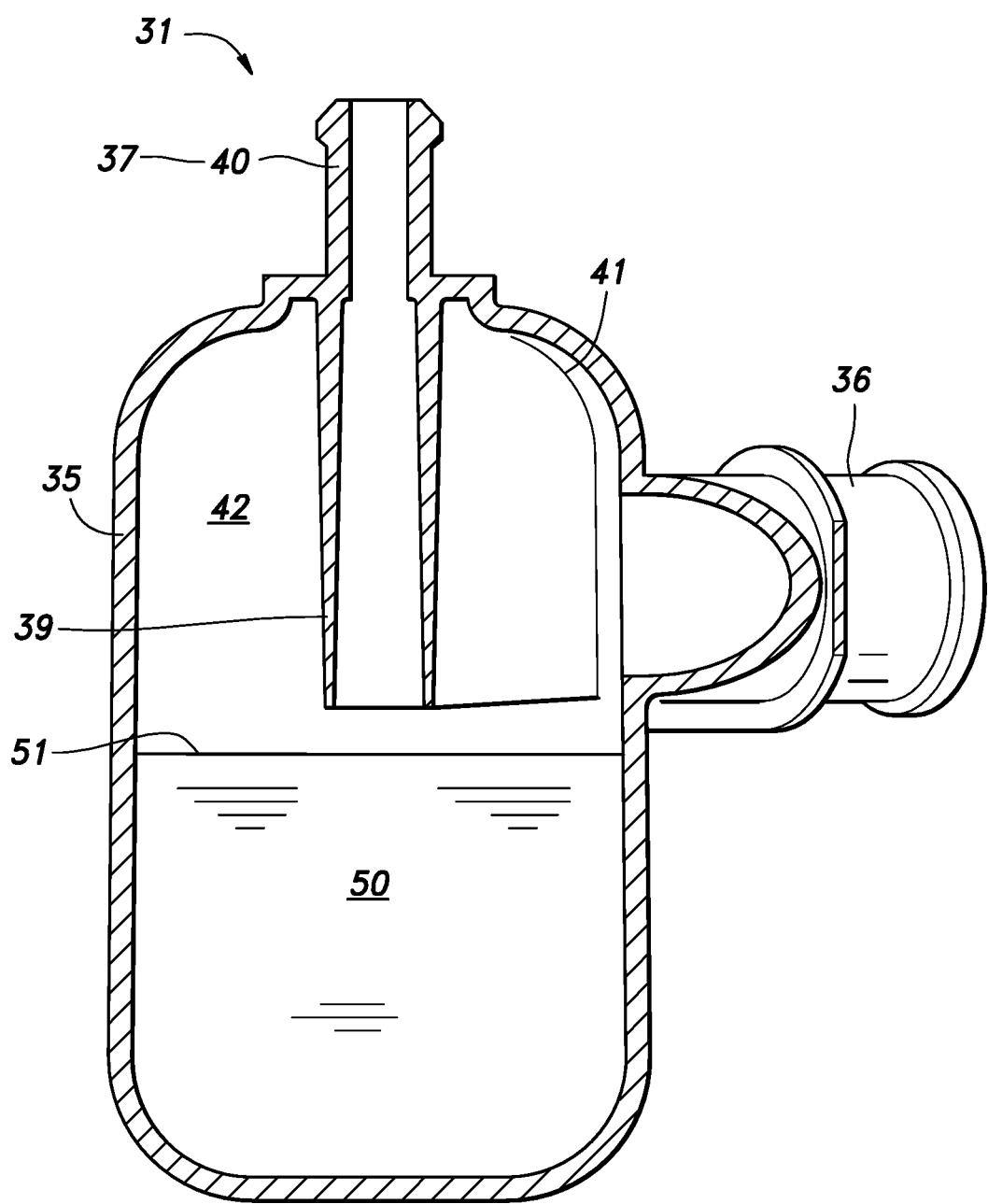
FIG. 4 is a sectional view of the catch tank taken along line IV-IV in FIG. 3.

As shown in FIGS. 3 and 4, the catch tank 31 includes a case 35 that is cylindrical in shape and has a central axis extending in the up-down direction, an inlet pipe 36 extending from an upper portion of an outer circumferential surface of the case 35 in a tangential direction, and an outlet pipe 37 extending from an upper end of the case 35 along the central axis toward an interior of the case 35.

The tip of the inlet pipe 36 defines an inlet of the catch tank 31. The inlet pipe 36 is connected to the first part 32 of the bypass pipe 30. With additional reference to FIG. 5, the outlet pipe 37 includes an outlet pipe lower portion 39 extending downward (toward the interior of the case 35) from the upper end of the case 35 and an outlet pipe upper portion 40 extending upward from the upper end of the case 35. The outlet pipe lower portion 39 and the outlet pipe upper portion 40 both extend in the up-down direction along the central axis. The upper end of the outlet pipe upper portion 40 defines an outlet of the catch tank 31. The upper end of the outlet pipe upper portion 40 is connected to the second part 33 (the upstream part 33A) of the bypass pipe 30.

Figure 5:
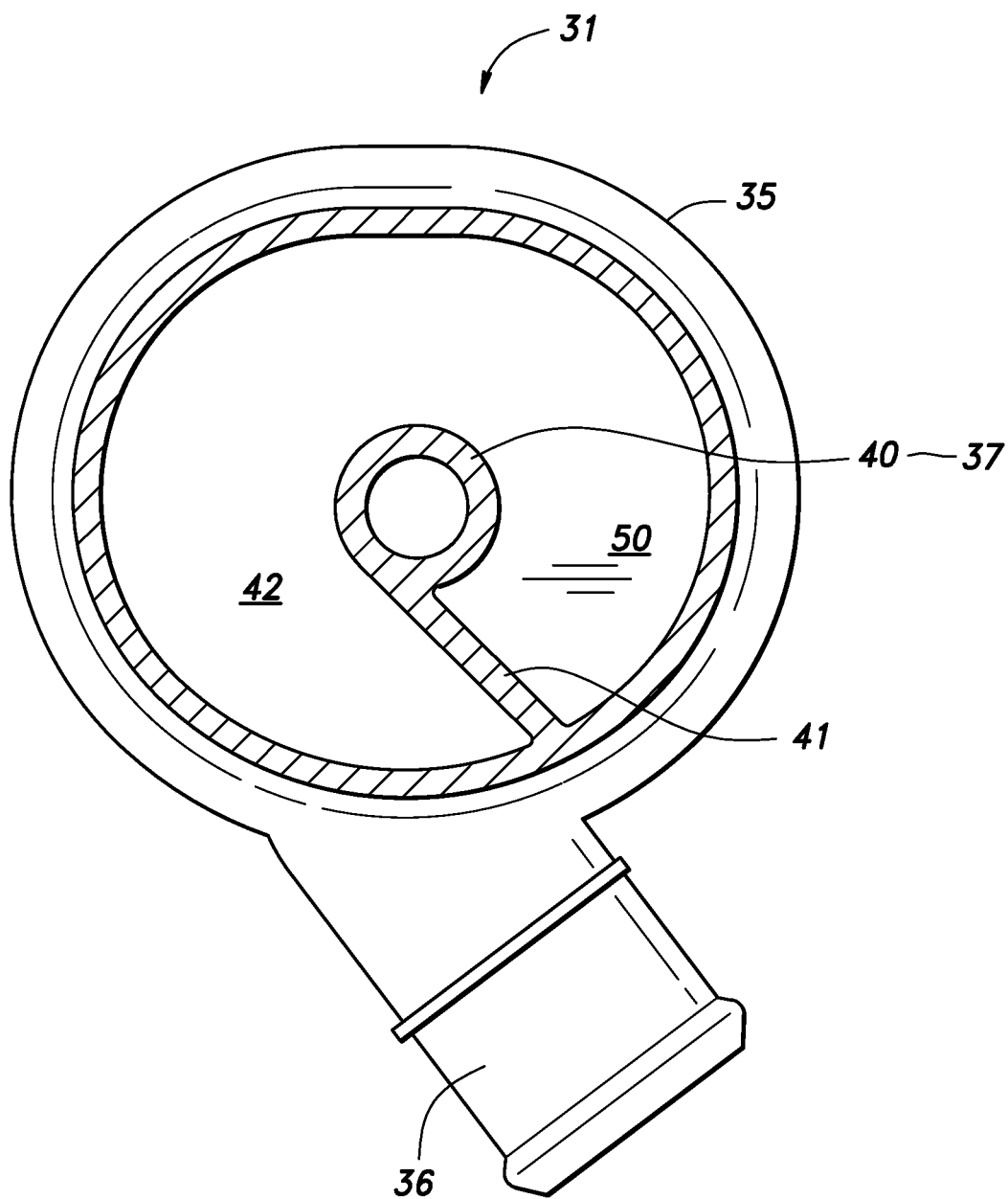
FIG. 5 is a sectional view of the catch tank taken along line V-V in FIG. 3.

The lower edge of the open end of the inlet pipe 36 on the side of the case 35 is disposed higher than the lower end of the outlet pipe 37. As shown in FIG. 5, the outer diameter of the inlet pipe 36 is substantially the same as the distance between the inner surface of the case 35 and the outer surface of the outlet pipe lower portion 39. As shown in FIG. 4, the lower end of the outlet pipe lower portion 39 is disposed such that a predetermined gap is defined between the lower end of the outlet pipe lower portion 39 and the bottom surface of the case 35. The inner diameter of the outlet pipe lower portion 39 gradually increases downward. In another embodiment, the outlet pipe lower portion 39 may have a constant inner diameter.

As shown in FIG. 5, the catch tank 31 further includes a partition wall 41 connected to the inner surface of the case 35 and the outlet pipe 37. The partition wall 41 extends substantially in parallel with the inlet pipe 36. The partition wall 41 extends in the up-down direction and the upper end of the partition wall 41 is connected to the upper wall of the case 35. Preferably, the partition wall 41 and the base end of the inlet pipe 36 are connected smoothly. In this way, the inner surface of the inlet pipe 36, the inner surface of the case 35, the outer surface of the outlet pipe lower portion 39, and the partition wall 41 define a flow path 42. In the present embodiment, as shown in FIG. 4, the lower end of the partition wall 41 and the lower end of the outlet pipe 37 are positioned at substantially the same height. In another embodiment, the lower end of the partition wall 41 may be disposed lower or higher than the lower end of the outlet pipe 37.

Also, as shown in FIGS. 1 and 2, a resonator 43 is connected to the bypass pipe 30. In the present embodiment, the resonator 43 is connected to a part of the bypass pipe 30 downstream of the catch tank 31, namely, to the second part 33 of the bypass pipe 30. More specifically, the resonator 43 is connected to the bent part 33B of the bypass pipe 30. The resonator 43 includes a main body 44 defining a volume chamber and disposed higher than the catch tank 31 and a communication pipe part 45 extending downward from the bottom surface of the main body 44 and connected to the second part 33. The communication pipe part 45 is connected to the bent part 33B of the bypass pipe 30. The communication pipe part 45 has a cross-sectional area substantially the same as the cross-sectional area of the second part 33. In the present embodiment, the communication pipe part 45 has a cross-sectional area substantially the same as the cross-sectional area of the upstream part 33A and the bent part 33B.

Next, a mode of operation of the internal combustion engine 1 and the intake device 4 provided in the internal combustion engine 1 will be described. The air sucked in through the suction port 13 is introduced into the compressor 18 after foreign matter is removed at the air cleaner 16, and is pressurized in the compressor 18. Thereafter, the air is introduced into the cooling part 26 of the intercooler 19 via the upstream header 27 and is cooled therein. At this time, part of the moisture in the air is condensed to generate condensed water. Thereafter, the air and the condensed water are guided to the first part 32 of the bypass pipe 30 or the intermediate portion 15 of the main pipe 14 via the downstream header 28.

In the present embodiment, the cooling part 26, the downstream header 28, and the first part 32 extend in the lateral direction and the intermediate portion 15 extends upward from the downstream header 28. Thereby, due to inertial force, the condensed water, which has a relatively large mass, is likely to be guided to the first part 32 of the bypass pipe 30, while the air, which has a relatively small mass, is likely to be guided to the intermediate portion 15.

As shown in FIG. 5, the condensed water (and part of the air) guided to the first part 32 flows through the flow path 42 in the case 35 and thereafter hits the partition wall 41. The condensed water flows down along the partition wall 41 and is stored in a lower portion of the case 35 to form a storage part 50. Thereby, the intake device 4 according to the embodiment of the present invention can efficiently separate the condensed water and the air and can efficiently store the condensed water in the catch tank 31 (the case 35). Also, since the lower edge of the open end of the inlet pipe 36 on the side of the case 35 is disposed higher than the lower end of the outlet pipe 37, the liquid surface 51 of the storage part 50 is maintained lower than the open end of the inlet pipe 36 on the side of the case 35. Thereby, reverse flow of the condensed water can be prevented.

Since the pressure in the bypass pipe 30 on the side of the second end 30B becomes negative relative to the pressure in the catch tank 31 due to downward stroke of the piston of the internal combustion engine main body 3, the condensed water stored in the storage part 50 is sucked up from the liquid surface 51 into the lower end of the outlet pipe lower portion 39 while being caught in the air flow in the case 35. As the amount of condensed water guided into the case 35 increases and the distance between the liquid surface 51 and the lower end of the outlet pipe lower portion 39 becomes relatively short, the amount of condensed water sucked up from the storage part 50 increases. On the other hand, when the distance between the liquid surface 51 and the lower end of the outlet pipe lower portion 39 becomes relatively long, the amount of condensed water sucked up from the storage part 50 decreases. Due to these, the distance between the upper end (water surface) of the storage part 50 and the lower end of the outlet pipe lower portion 39 is maintained at a substantially constant value.

As shown in FIGS. 1 and 2, the condensed water sucked up from the storage part 50 flows through the outlet pipe 37 and the second part 33 to merge into the intermediate portion 15 of the main pipe 14. At this time, part of the condensed water intrudes into the communication pipe part 45 of the resonator 43. In the present embodiment, since the resonator 43 is disposed above the catch tank 31 and the communication pipe part 45 extends downward from the bottom surface of the main body 44, even when the condensed water intrudes into the communication pipe part 45, the condensed water is guided downward by gravity, and thus, the condensed water is unlikely to stay in the resonator 43. Thereby, risk of corrosion of the resonator 43 due to the condensed water is reduced.

Incidentally, during operation of the internal combustion engine 1, when the opening degree of the throttle valve 20 is reduced according to a deceleration operation such as easing back of the accelerator pedal, the piston of the internal combustion engine main body 3 reciprocates under a condition with a reduced amount of intake air supply, whereby the magnitude of the negative pressure in the part of the main pipe 14 downstream of the throttle valve 20 increases. In the present embodiment, the first end 30A and the second end 30B of the bypass pipe 30 are connected to a part of the main pipe 14 downstream of the intercooler 19 and upstream of the throttle valve 20. Thereby, even when the internal combustion engine 1 is idling and the magnitude of the negative pressure in the part of the main pipe 14 downstream of the throttle valve 20 becomes large, it is possible to prevent a large amount of water from being discharged from the catch tank 31 per predetermined time. Thereby, misfire of the internal combustion engine 1 while idling can be prevented.

On the other hand, at high rotation speeds, the piston in the combustion chamber reciprocates with the throttle valve 20 opened, and this causes a large negative pressure in the pressure in the second end 30B side of the bypass pipe 30 relative to the pressure in the catch tank 31. As a result, a relatively large amount of condensed water is guided from inside the catch tank 31, but at this time, the temperature in the combustion chamber is kept relatively high, and therefore, combustion can be performed without misfire of the internal combustion engine 1.

Next, with reference to FIG. 6, effects of the resonator 43 in the present embodiment will be described. The resonator 43 is a member for reducing the intake sound generated in the intake device 4 by applying the Helmholtz Resonance Principle. The intake sound, which is caused by pulsation of intake air flowing through the main pipe 14, is converted from sound wave vibration energy to thermal energy due to fluid friction in the communication pipe part 45 and reflection of the intake sound by the main body 44.

Figure 6:
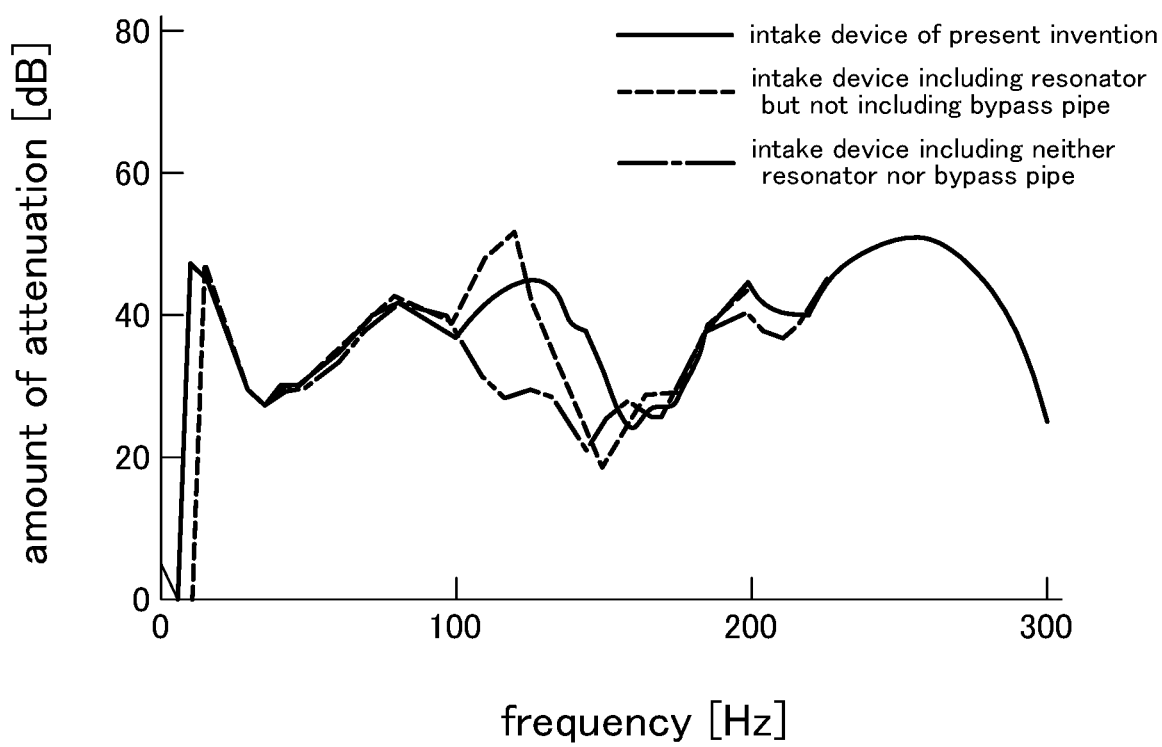
FIG. 6 is a graph showing a relationship between an amount of attenuation of intake sound and intake sound frequency in the intake device.

FIG. 6 is a graph showing a relationship between the amount of attenuation of the intake sound generated during operation of the internal combustion engine 1 (vertical axis) and the frequency of the intake sound (horizontal axis). In this graph, the solid line indicates the measurement result regarding the intake device 4 including the resonator 43 and the bypass pipe 30 according to the present embodiment, the broken line indicates the measurement result regarding an intake device which does not include a bypass pipe and includes a resonator whose communication pipe part is connected to the intermediate portion 15 of the main pipe 14, and the one-dot chain line indicates the measurement result regarding an intake device including neither the resonator nor the bypass pipe.

In the intake device indicated by the broken line, the amount of attenuation of the intake sound reaches the peak at the frequency of about 120 Hz and considerably decreases at the frequency of about 160 Hz. In the intake device indicated by the one-dot chain line, there is no peak seen in the amount of attenuation, but the amount of attenuation of the intake sound considerably decreases at the frequency of about 160 Hz. In contrast, in the intake device 4 according to the present embodiment indicated by the solid line, the amount of attenuation of the intake sound reaches the peak at the frequency of about 135 Hz. Also, the amount of attenuation of the intake sound does not decrease considerably at the frequency of about 160 Hz.

The above results indicate that the intake device 4 including the resonator 43 and the bypass pipe 30 of the present embodiment can demonstrate sufficient sound-absorbing function. Also, since the communication pipe part 45 of the resonator 43 is connected to the second part 33 (the bent part 33B) of the bypass pipe 30, the second part 33 of the bypass pipe 30 can demonstrate a function similar to that of the communication pipe part 45 of the resonator 43. Thereby, the intake device 4 according to the present embodiment can absorb the intake sound in a desired frequency band while maintaining the length of the communication pipe part 45 relatively short, and thus, the resonator 43 can be made compact in size.

Concrete embodiments of the present invention have been described in the foregoing, but the present invention is not limited to the above embodiments and may be modified or altered in various ways. For example, the cross-sectional areas of the intermediate portion 15, the second part 33, and the communication pipe part 45 may be determined as appropriate for the resonator 43 to effectively attenuate the intake sound in a desired frequency band. Also, though in the above embodiment, the communication pipe part 45 is connected to the bent part 33B of the second part 33, the communication pipe part 45 may be connected to the upstream part 33A or the downstream part 33C in another embodiment.

The invention claimed is:

1. An intake device for an internal combustion engine, comprising:
   a main pipe having an upstream end forming a suction port and a downstream end configured to be connected to an intake port of an internal combustion engine main body;
   a compressor of a supercharger provided in the main pipe;
   an intercooler provided in the main pipe at a position downstream of the compressor and including a cooling part, an upstream header provided upstream of the cooling part, and a downstream header provided downstream of the cooling part;
a throttle valve disposed in the main pipe at a position downstream of the intercooler;
a bypass pipe having a first end and a second end, the bypass pipe being connected to a part of the main pipe between the cooling part and the throttle valve;
a catch tank provided in the bypass pipe and configured to catch condensed water; and
a resonator connected to a part of the bypass pipe downstream of the catch tank,
wherein the bypass pipe comprises:
a first part including the first end and connected to an inlet of the catch tank; and
a second part including the second end and extending upward from an outlet of the catch tank, and
the resonator comprises:
a main body defining a volume chamber and disposed higher than the catch tank; and
a communication pipe part extending downward from a bottom surface of the main body and connected to the second part.

2. The intake device according to claim 1, wherein the cooling part of the intercooler includes multiple heat dissipation pipes extending in a first axial direction,
the main pipe comprises an intermediate portion extending from the downstream header in a direction perpendicular to the first axial direction, and
the first part of the bypass pipe is connected to the downstream header and extends in the first axial direction.

3. The intake device according to claim 2, wherein the second part of the bypass pipe has a cross-sectional area smaller than a cross-sectional area of the intermediate portion of the main pipe.

4. The intake device according to claim 2, wherein the cooling part, the downstream header, and the first part of the bypass pipe extend in a lateral direction of a vehicle in which the internal combustion engine is mounted, and
the intermediate portion extends from the downstream header upward with respect to the vehicle.

5. The intake device according to claim 1, wherein the catch tank comprises:
a case that is cylindrical in shape and has a central axis extending in an up-down direction;
an inlet pipe extending from an upper portion of an outer circumferential surface of the case in a tangential direction;
an outlet pipe extending from an upper end of the case along the central axis toward an interior of the case; and
a partition wall connected to an inner surface of the case and the outlet pipe,
the inlet pipe is connected to the first part,
an upper end of the outlet pipe is connected to the second part, and
a lower end of the outlet pipe is disposed such that a predetermined gap is defined between the lower end of the outlet pipe and a bottom surface of the case.

6. The intake device according to claim 5, wherein a lower edge of an open end of the inlet pipe on a side of the case is disposed higher than the lower end of the outlet pipe.

* * * * *